United States Patent [19]
Leone

[11] 3,807,236
[45] Apr. 30, 1974

[54] MOUNTING FOR INDICATING INSTRUMENT MECHANISM TO FACILITATE ASSEMBLY/DISASSEMBLY

[75] Inventor: Anselm James Leone, Quincy, Mass.

[73] Assignee: Bunker Ramo Corporation, Oak Brook, Ill.

[22] Filed: Aug. 8, 1973

[21] Appl. No.: 386,794

[52] U.S. Cl. ................................. 73/431, 58/88 R
[51] Int. Cl. ......................... G04b 37/00, B21j 7/12
[58] Field of Search ................ 73/430, 431; 58/88 R

[56] References Cited
UNITED STATES PATENTS
1,307,685   6/1919   Letord ........................ 73/431 UX Primary Examiner—George H. Miller, Jr.
Attorney, Agent, or Firm—Frederick M. Arbuckle; D. R. Bair

[57] ABSTRACT

Mechanism case for a clock or similar instrument having a fragile indicating pointer on the face, normally protected by a glass mounted in a bezel, carries a plurality of rearwardly extending studs. The studs are received in corresponding recesses in an outer housing. Coil springs in the recesses are normally of such length that when the bezel is removed they raise the mechanism case to a position where it projects substantially above the outer housing, permitting the outer rim of the case to be easily grasped for manual removal without tools, and without hazard to the indicating pointer.

Upon replacement, manual pressure against the bezel is sufficient to compress the springs, permitting threads on the bezel to be engaged with corresponding threads on the housing. Uniformity of spring pressure around the periphery assists manual effort to keep bezel parallel with housing so that threads can be engaged without cocking or cross-threading. Orientation of the studs and recesses assures that the mechanism will be accurately located with the dial figures in the desired relation with respect to the housing. Screwing down the bezel compresses a resilient pad between the back of the mechanism case and the back of the housing, providing a degree of reduction of radiated sound.

8 Claims, 4 Drawing Figures

PATENTED APR 30 1974 3,807,236
FIG.1 FIG.2
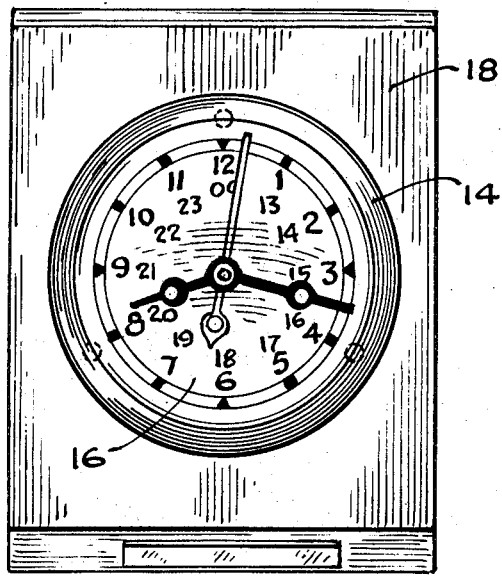
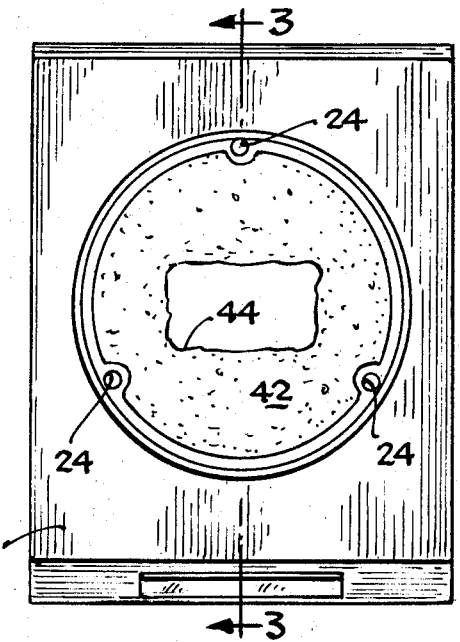
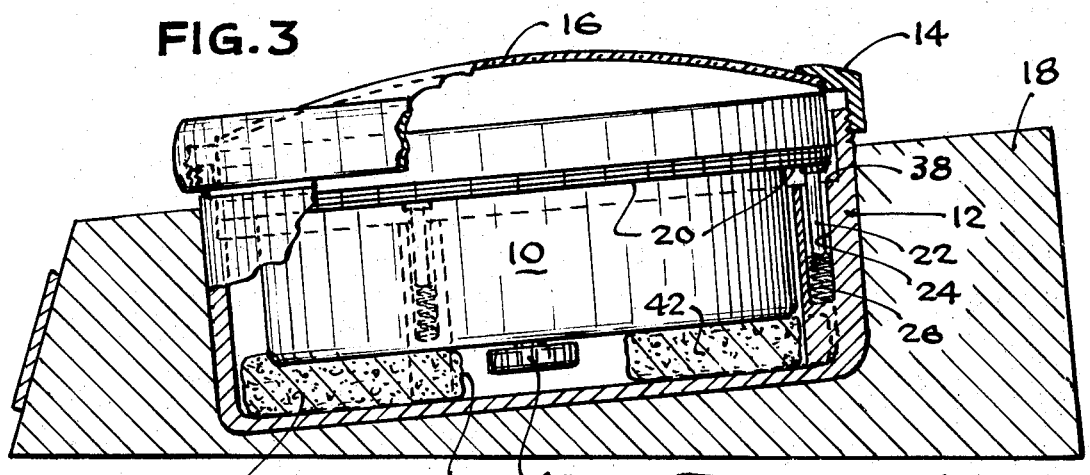
FIG.3
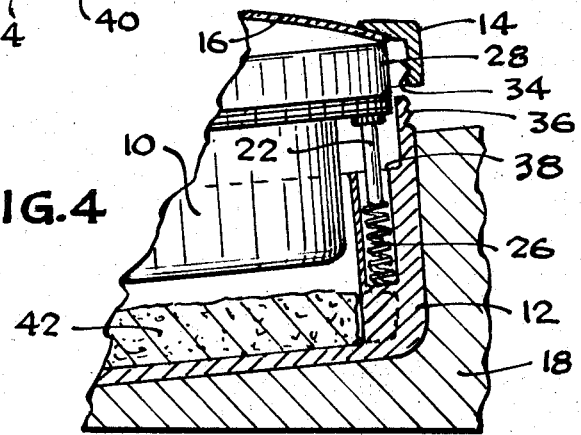
FIG.4

MOUNTING FOR INDICATING INSTRUMENT MECHANISM TO FACILITATE ASSEMBLY/DISASSEMBLY

BACKGROUND OF THE INVENTION

It is desirable to enclose an instrument such as a high grade clock movement or barometer in such a way that it is protected from dust and atmospheric pollutants, and to guard the hands or indicating pointer from accidental damaging contact to the greatest extent reasonably possible. Nevertheless, it is necessary to provide for access as may be required for setting, for winding (in the case of spring-driven movements), or for battery replacement (in the case of battery-powered movements). Some users, in addition, may desire a convenient way to mount the instrument in different places at different times. For example, an accurate clock such as a chronometer is an important utility in a boat, but during the season when the boat is in storage, the owner may enjoy having his fine clock movement in service as a desk accessory.

Consequently there is a need for a mounting which will make such usage convenient and practical yet will minimize the possibility of damage to fragile pointers. The present invention meets that need in a very satisfactory way.

SUMMARY OF THE INVENTION

The invention consists in the provision, for an instrument mechanism case, of an outer housing, bezel and crystal, with spring means so arranged that when the bezel is unscrewed from the housing, the mechanism case is raised out of the housing enough to permit its periphery being easily grasped for removal. It can then be adjusted, set or wound as necessary. There is no need for tools, because the case does not need to be pried out of the housing, and there is no temptation to grasp the hands or pointer in order to lift the mechanism.

The spring force is uniformly distributed about the periphery of the case, so that in the converse operation, when the mechanism case is replaced in the housing, the user is assisted in maintaining parallelism of the bezel and housing, and the threads can be engaged without cocking or cross-threading. In addition, the guide members against which the spring means bear serve also as indexing devices, by which the mechanism is oriented in the housing exactly in upright position.

The invention is described below in further detail, and illustrated in the following drawings.

DESCRIPTION OF THE DRAWINGS

FIG. 1 is a plan view of a desk clock with a mounting for the clock mechanism in accordance with the invention;

FIG. 2 is a plan view similar to FIG. 1, but with the bezel and clock mechanism case removed from the housing;

FIG. 3 is a vertical sectional view taken on the line 3—3 of FIG. 2, showing the relation of parts in the normal closed or mounted position; and FIG. 4 is a fragmentary sectional view similar to FIG. 3, but showing the parts in the position which they assume when the bezel is fully unscrewed.

DETAILED DESCRIPTION

While the invention may be embodied in various forms, it is exemplified here in a desk clock. The type of clock mechanism is not important to the invention, which can be equally readily applied to a spring wound or to a battery powered movement, or to other types.

The movement is enclosed in a mechanism case 10, which in turn is supported in a housing 12, provided with a bezel 14 carrying a crystal 16. The housing 12 may be provided with a suitable ornamental base 18, where service as a desk clock is desired, or it may be provided with appropriate hardware for wall or instrument panel mounting.

The mechanism case has an outwardly extending annular flange portion 20, from which guide members 22 extend in a rearward direction. The housing 12 is provided with recesses 24 properly oriented to receive the guide members. The recesses contain springs 26 which when uncompressed are of such length that the guide members do not fully enter the recesses, and the mechanism case is therefore supported with a part 28 extending beyond the housing 12, as may be seen in FIG. 4. This extension permits the mechanism case to be firmly and safely gripped around its periphery by the fingers when it is desired to remove it for setting, for battery replacement, or to transfer the movement to another mounting. Since it is not necessary to pry the mechanism case out of the housing, no tools are required, and there is no risk of damage to fragile hands or pointer such as might occur if the user were tempted to grasp the hands or shaft hubs in an effort to lift the works out of the housing.

The length of each spring, its stiffness, and the depth of the corresponding recess are such that the projection 28 of the mechanism case beyond the housing is substantially the same at all points when the bezel is removed. This is obviously an aid to the user when the bezel is replaced, helping to avoid cocking and cross-threading.

When the bezel 14 is manually pressed down against the mechanism case, the springs 26 are compressed to the point where the internal threads 34 of the bezel can be engaged with the external threads 36 on the housing 12 (as seen in FIG. 3), after which rotation of the bezel in threaded engagement with the housing will further compress the springs and firmly seat the flange 20 against the shoulder 38 of the housing.

Since a setting knob 40, and possibly other controls, must project from the back of the mechanism case, it is necessary to provide clearance space between the back of the case and the bottom of the housing 12, and this space may contain a foam cushion pad 42, the thickness of which is so chosen that the pad is somewhat compressed as the bezel is screwed home. A cut-out 44 in the pad allows a clear space for the setting knob.

The cushion pad serves the dual purpose of helping to lift the mechanism out of the housing when the bezel is unscrewed, and of attenuating to some extent the transmission of sounds generated by the operation of the mechanism in normal use.

Any convenient number of guide members 22 may be provided, preferably uniformly spaced around the periphery of the mechanism case, so that when the bezel is pressed to engage the threads 34 and 36, the spring resistance around its circumference will be substantially uniform. Use of guide pins with recesses as shown assures that the mechanism case will not rotate in the housing as the bezel is being tightened, and that the dial will be neatly oriented and square with respect to the base 18.

Although the invention is here exemplified as applicable to a clock, it has equally appropriate utility for a barometer of the aneroid type, a compass, or a similar type of portable instrument, most especially one having delicate indicating pointers which should not be grasped for lifting the mechanism.

As previously suggested, housing 12 and its appurtenances may be supported otherwise than in an ornamental base such as 18. It may be located, for example, in a wall plaque or mantel case, or in an instrument panel for a boat or aircraft. In any such instance, the structural arrangements which have been described facilitate convenient transfer of the instrument from one locale to another.

The simiplicity, economy, convenience and other advantages of the construction described will be noted by those skilled in this art. Some changes may be made in the details of construction without departing from the basic concept of the invention, which is defined in the following claims.

The invention claimed is:

1. A mounting for a mechanism case of a portable instrument having a delicate indicating pointer on its face, comprising a housing adapted to receive said mechanism case, a bezel adapted for engagement with said housing and overlapping said case when so engaged, said bezel carrying a crystal protecting said pointer when said bezel is engaged with said housing, and spring means in said housing acting upon said case when said case is received in said housing, said spring means requiring to be compressed before said bezel can be engaged with said housing, and said spring means when uncompressed supporting said case with a portion of said case including the face projecting outside of said housing to permit manual grasping of the projecting portion of the periphery of said case.

2. A mounting in accordance with claim 1, wherein said bezel and said housing have interfitting threaded portions.

3. A mounting in accordance with claim 1, including means preventing rotation of said mechanism case relative to said housing when said bezel is rotated relative to said housing.

4. A mounting for a mechanism case of clock comprising a housing adapted to receive said mechanism case, a plurality of guide members extending rearwardly from said case, said housing having recesses formed therein and oriented to receive said guide members, a bezel adapted for engagement with said housing and overlapping said case when so engaged, and springs in said recesses engaging said guide members and of such length as when uncompressed to support said case projecting above said base, and requiring to be compressed before said bezel can be engaged with said case.

5. A mounting in accordance with claim 4 wherein said guide members are spaced equidistantly around the periphery of said case.

6. A mounting in accordance with claim 4 wherein the length and stiffness of said springs, and the depths of the corresponding recesses are such that when said bezel is not engaged with said housing, the case is supported above the housing by the same distance at all points to aid the user in avoiding cocking of the bezel with respect to the housing when the bezel is pressed down for engagement with said housing.

7. A mounting in accordance with claim 4 including a cushion pad between the rear of said mechanism case and the bottom of said housing, said pad being partially compressed between said case and said housing when said bezel is fully engaged with said housing.

8. A mounting for a mechanism case of a portable instrument having a delicate indicating pointer on its face, comprising a housing adapted to receive said mechanism case, said housing having threads thereon, a bezel having threads adapted for threaded engagement with said housing, said bezel overlapping said case when so engaged, and said bezel carrying a crystal protecting said pointer when said bezel is engaged with said housing, and spring means acting upon said case when said case is received in said housing, said spring means requiring to be compressed before said bezel can be engaged with said housing, and said spring means acting uniformly upon said case in a way tending to maintain parallelism between said housing threads and said bezel threads, aiding the user in achieving correct thread relation when the bezel is pressed down to initiate engagement of said bezel threads and said housing threads.

* * * * *